United States Patent
Kobayashi et al.

[15] 3,670,719
[45] June 20, 1972

[54] CATHETER TYPE SEMICONDUCTOR RADIATION DETECTOR

[72] Inventors: Tetsuji Kobayashi, Yokohama-shi; Seiichi Takayanagi, Tokyo, both of Japan

[73] Assignee: Tokyo Shibaura Electric Co., Ltd., Kawasaki-shi, Japan

[22] Filed: Oct. 22, 1969

[21] Appl. No.: 868,355

[30] Foreign Application Priority Data

Oct. 25, 1968 Japan..................................43/77323

[52] U.S. Cl.............................................128/2 A, 250/83 R
[51] Int. Cl. ...........................................................A61b 6/00
[58] Field of Search........................128/2, 1.1, 1.2, 418, 215; 250/83 R, 83.6 W

[56] References Cited

UNITED STATES PATENTS

| | | | |
|---|---|---|---|
| 2,967,933 | 1/1961 | Scherbatskoy | 250/83.3 W X |
| 3,288,210 | 11/1966 | Bryant | 250/83.6 W X |
| 3,339,542 | 9/1967 | Howell | 128/2 R |
| 3,378,097 | 4/1968 | Straus et al. | 250/83.6 W X |
| 3,402,769 | 9/1968 | Doggett et al. | 250/83.6 W X |
| 3,427,454 | 2/1969 | Webb | 250/83 |

FOREIGN PATENTS OR APPLICATIONS

| | | | |
|---|---|---|---|
| 327,906 | 2/1958 | Switzerland | 128/2 |
| 233,160 | 3/1970 | U.S.S.R. | 128/2 |

Primary Examiner—Richard A. Gaudet
Assistant Examiner—Kyle L. Howell
Attorney—Flynn & Frishauf

[57] ABSTRACT

A catheter type semiconductor radiation detector for insertion into a living body includes an elongated, preferably cylindrical semiconductor radiation detector having a first detecting portion non-directionally sensitive to radiation in a direction perpendicular to the longitudinal axis of the detector and at least a second detecting portion directionally sensitive to radiation in the direction perpendicular to the longitudinal axis of the detector.

5 Claims, 4 Drawing Figures

TETSUJI KOBAYASHI &
SEIICHI TAKAYANGI
INVENTORS

CATHETER TYPE SEMICONDUCTOR RADIATION DETECTOR

BACKGROUND OF THE INVENTION

This invention relates to a catheter type semiconductor radiation detector for use in the diagnosis of abnormal organizations, such as cancers, and in which the time for diagnosis can be shortened.

It is well known that when a radioactive isotope such as $32_p$ is dosed to a living body, the radioactive isotope is accumulated in greater quantity in the abnormal organization than in the normal organization. Such a phenomenon has been utilized in medical diagnosis by placing a radiation detector in the neighborhood of the abnormal organization and by measuring the amount of radioactivity in a position where radioactivity is accumulated. It is also known that a semiconductor radiation detector can be validly used for this purpose. Such a detector comprises a semiconductor radiation detecting element, means for impressing an operating voltage across said detecting element and measuring a radiation detection signal, and a coaxial cable for electrically connecting said detecting element said voltage supply and radiation measuring means.

It has been the practice that the measurement at one place requires a lengthy period of time, viz. several to tens of minutes because of the very small amount of the radioactivity absorbed in a living body. Since an abnormal organization must be searched for without direct observation, it is necessary to effect measurement a number of times to finally locate the abnormal organization, with the result that the total time required for diagnosis is lengthy. This gives the patient great hardship.

SUMMARY OF THE INVENTION

An object of the present invention is to provide a catheter type semiconductor radiation detector which can greatly reduce the time required for the diagnosing operation and hence, reduce the hardship of the patient.

Briefly stated, the semiconductor radiation detector of this invention includes a radiation detecting element having a non-directional detecting member and a directional detecting member. The detection signals from these detecting members are separately transmitted out of the living body and measured. The non-directional detecting member is adapted to detect the existence of an abnormal organization and the position of the abnormal organization in a vertical direction, while the directional member acts to detect the horizontal position of the abnormal organization in the vertically determined position, so that the exact position of an abnormal organization present in a body to be examined can be located within a short period of time.

DETAILED DESCRIPTION OF THE INVENTION

Figure 1:
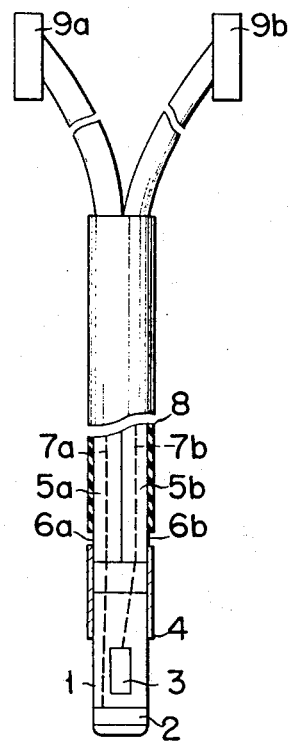
FIG. 1 is a schematic view, partly in section, of a semiconductor radiation detector embodying this invention.

Referring to FIG. 1, an N-type silicon semiconductor cylinder 1 has first and second P-type regions 2 and 3 formed by a conventional method with P-N junctions being formed between the N and P-type regions. The first P-type region 2 is formed continuously in the entire outer circumference of the N-type cylinder 1 and has a uniform sensitivity to radiation acting in the direction of the radius of the cylinder 1. The first P-type region 2 constitutes a non-directional detecting member. The second P-type region 3 is formed in a part of the outer circumferential surface of the cylinder 1 and is sensitive to locate radiation acting in the radial direction of the cylinder 1, thus constituting a directional detecting member. The N-type cylinder 1 and the P-type regions 2 and 3 constitute a semiconductor radiation detector element. One end of the N-type cylinder 1 is securely inserted into one end of a metallic sleeve 4 whose opposite end receives two coaxial cables 5a and 5b. The shield conductors 6a and 6b of the coaxial cables 5a and 5b are electrically connected with said sleeve 4, and the core conductors 7a and 7b of the coaxial cables 5a and 5b are connected with the second and first P-type regions 3 and 2, respectively. The coaxial cables are covered with an insulating tube 8. The coaxial cables have predetermined lengths and are separated from each other at portions which are to be left outside the patient's body, and have respective connectors 9a and 9b coupled to the ends thereof. The connectors 9a and 9b are connected to a power source (not shown) for applying an operating voltage across the semiconductor detecting element, and a measuring device (not shown) including a counter for counting radiation detection signals and thereby measuring the amount of detected radiation.

Figure 2:
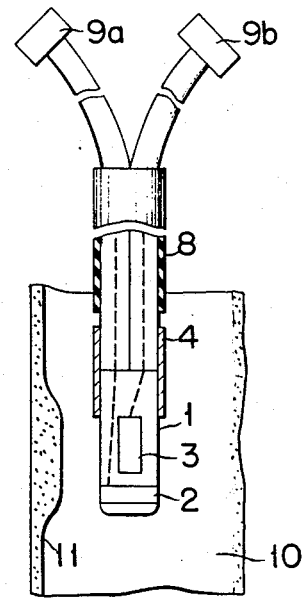
FIG. 2 shows a schematic view of the radiation detector as applied to the esophagus.

Referring to FIG. 2, when cancer of the esophagus is to be diagnosed with the device of the above-mentioned arrangement, the detecting element is passed into the esophagus 10 through the patient's mouth with the aid of the coaxial cables serving as a guide line. If a cancerous organization 11 exists, the first P-type region 2, which is non-directional, determines the position of the cancer organization 11 in the vertical direction in FIG. 2. Upon detection of the vertical position of the organization 11, the detector element may be suitably rotated to detect a place at which the second directional region 3 most strongly emits a detection signal, namely a place at which said region 3 faces the cancer organization 11. Such a position is detected by the measuring device outside the patient's body by measuring the angle of rotation of the detector.

The position of an abnormal organization is thus detected by first determining it in respect of a vertical direction in the figure and then determining it in respect of a horizontal direction. Thus, detecting operation in plural positions, which has hitherto been necessary, can be avoided whereby the position of an abnormal organization can be accurately determined within a greatly shortened period of time which reduces the patient's hardship during diagnosis.

Figure 3:
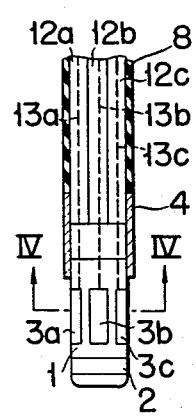
FIG. 3 is a schematic view, partly in section, of a modification of the detector.
Figure 4:
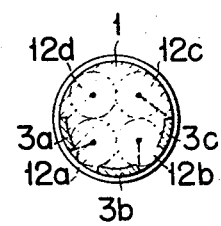
FIG. 4 is a cross sectional view taken along a line IV — IV and viewed in the direction of the arrows in FIG. 3.

FIGS. 3 and 4 show a modification of the detector in which the angle of rotation can be reduced to shorten the time for the detecting operation and in which the same or like reference numerals as used in FIGS. 1 and 2 designate like portions. Instead of a single directional P-type region, three regions 3a, 3b and 3c are spacedly arranged in the outer circumference of the N-type cylinder 1 along approximately half the length of the circumference, and are connected respectively with core conductors 13a, 13b and 13c of the coaxial cables 12a, 12b and 12c. A coaxial cable 12d is connected to the non-directional P-type region 2. The coaxial cables 12a, 12b, 12c and 12d are collectively covered by an insulating tube 8, but are separated from each other at portions outside the patient's body to be connected to corresponding connectors (not shown).

According to the modification, it is not only possible to reduce the angle of rotation of the detector, but also to more accurately detect the position of an abnormal organization with respect to its horizontal direction.

It should be appreciated that a plurality of conductive cores may be arranged in a single coaxial cable having a single shield conductor instead of using a plurality of coaxial cables as hereinbefore described. In the foregoing embodiments, a plural number of P-type regions are formed on a single N-type substrate. It should be appreciated that independent P-N junction elements can be arranged as an alternative.

What is claimed is:

1. A catheter type semiconductor radiation detector comprising:

a semiconductor radiation detector element adapted to be inserted into a living body; and a coaxial line having one end electrically connected to said detector element, the other end of said coaxial line extending so as to transmit a radiation detection signal generated by said detector element outwardly of the living body and to supply operating power to said detector element;

the improvement wherein said detecting element comprises:

an elongated member formed of semiconductor material of one conductivity type and extending in the direction of the longitudinal axis of said coaxial line;

a first detecting portion of semiconductor material and having a conductivity type opposite to that of said elongated member, said first detecting portion extending around the entire circumference of a portion of the length of said elongated member, said first detecting portion being non-directionally sensitive to radiation in a direction perpendicular to the longitudinal axis of said elongated member; and a second detecting portion of semiconductor material and having a conductivity type opposite to that of said elongated member, said second detecting portion being formed apart from said first detecting portion and in a part of the circumference of said elongated member, said second detecting portion being directionally sensitive to radiation in said direction perpendicular to the longitudinal axis of said elongated member, P-N junctions being formed between the semiconductor material of said elongated member and said first and second detecting portions;

said coaxial line having a number of cable leads each respectively connected to one of said detecting portions.

2. The radiation detector of claim 1 wherein said elongated member is N-type semiconductor material, said first detecting portion is P-type semiconductor material, and said second detecting portion is P-type semiconductor material.

3. The radiation detector of claim 1 wherein said elongated member is a cylindrical member and said perpendicular direction is the radial direction of said cylindrical member.

4. The radiation detector of claim 2 including a plurality of second detecting portions of said opposite conductivity type formed around half the circumference of said cylinder.

5. The radiation detector of claim 4 wherein said plurality of second detecting portions are spaced from each other.

* * * * *